Sept. 8, 1959  J. C. PETREA  2,902,805
BAG CLOSER AND SEALER
Filed March 6, 1958  3 Sheets-Sheet 1
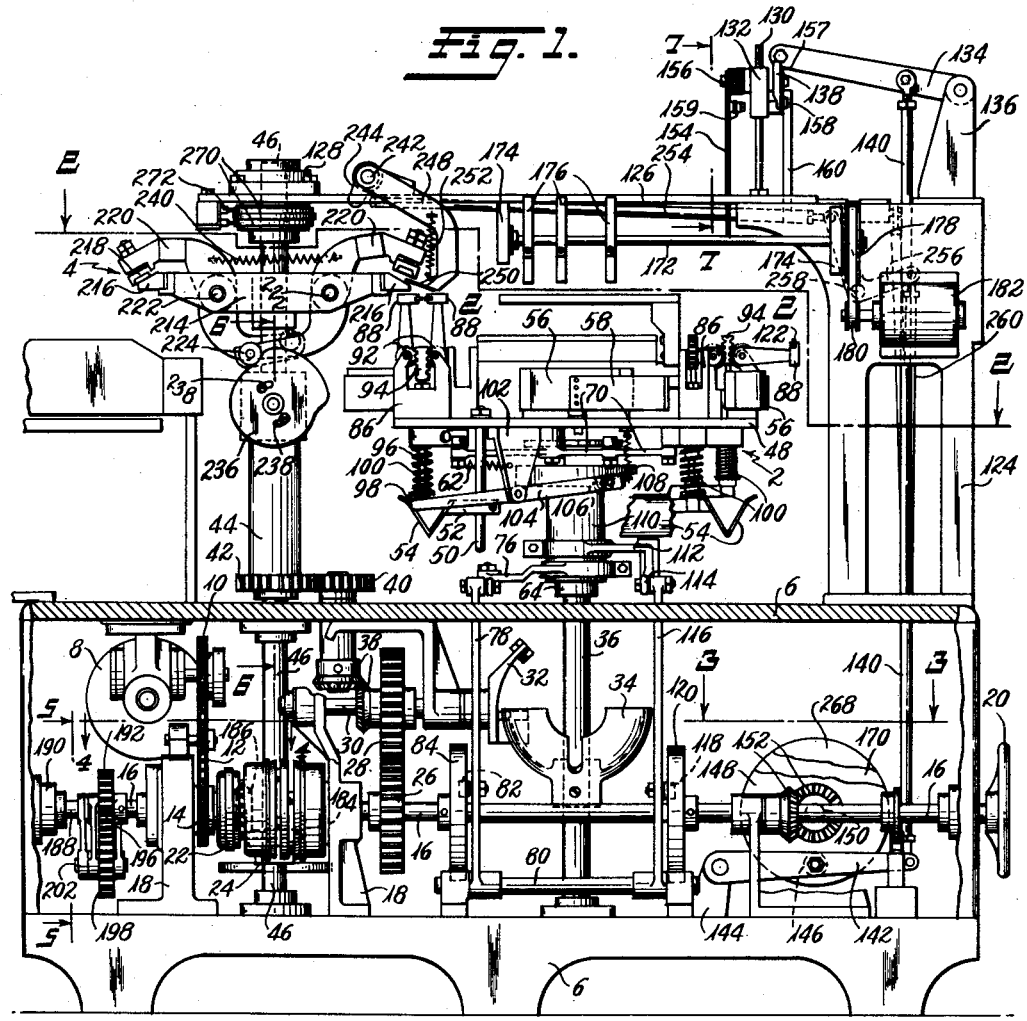
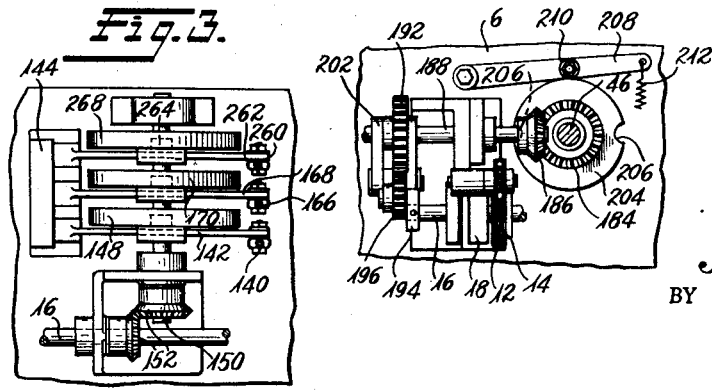
INVENTOR.
James C. Petrea
BY
Bacon & Thomas
ATTORNEYS

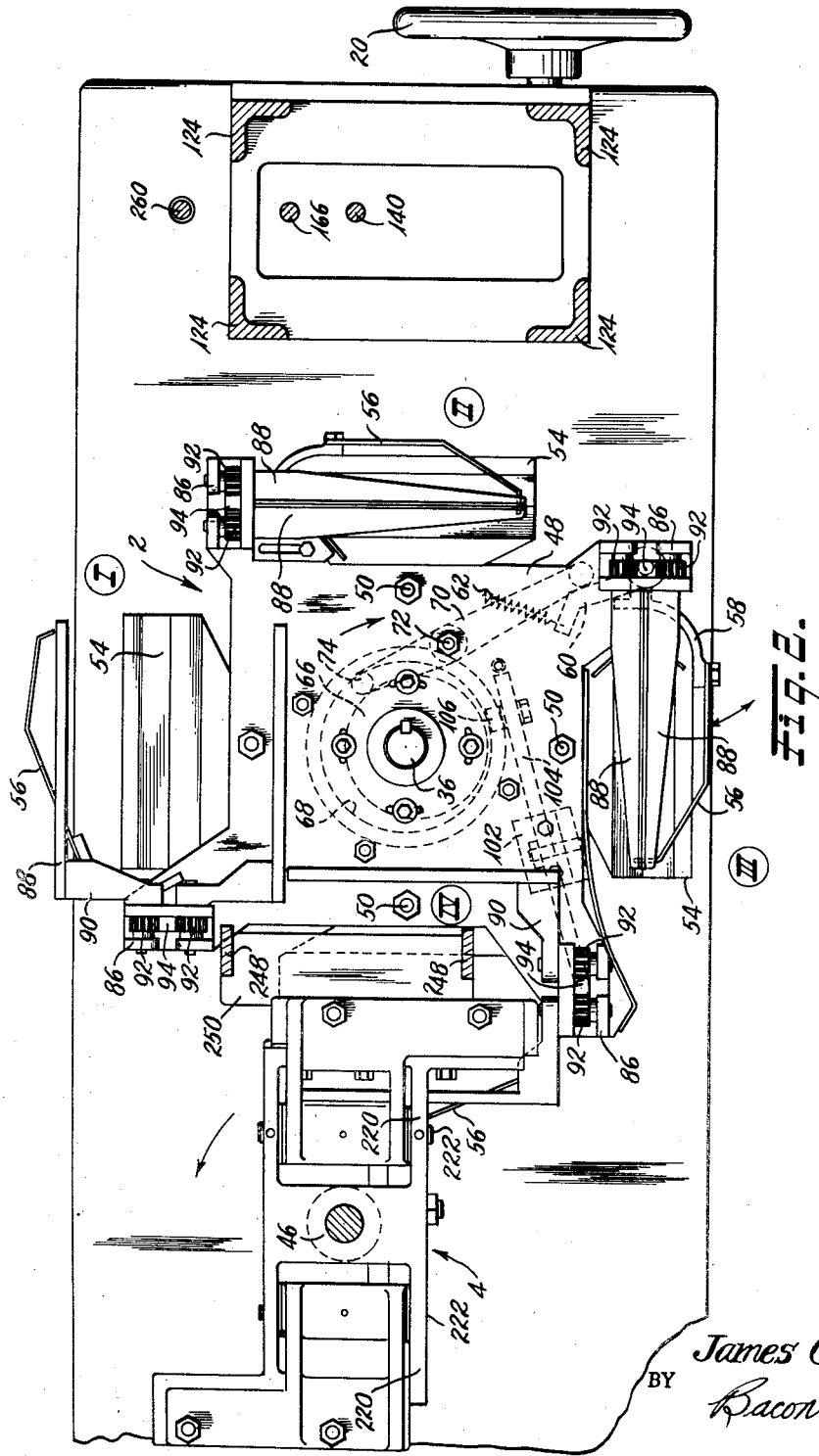

Sept. 8, 1959 J. C. PETREA 2,902,805
BAG CLOSER AND SEALER
Filed March 6, 1958 3 Sheets-Sheet 3
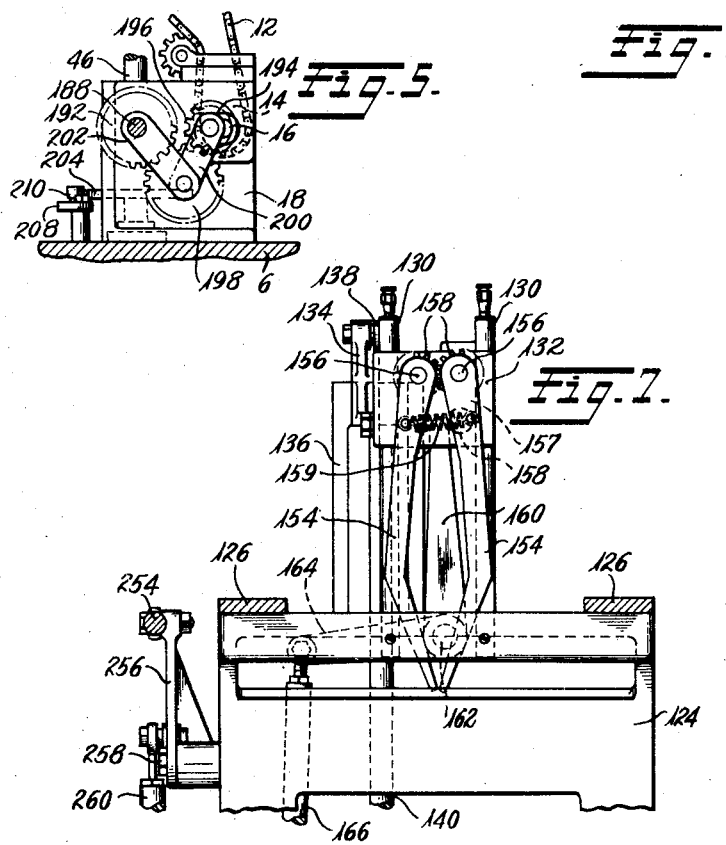
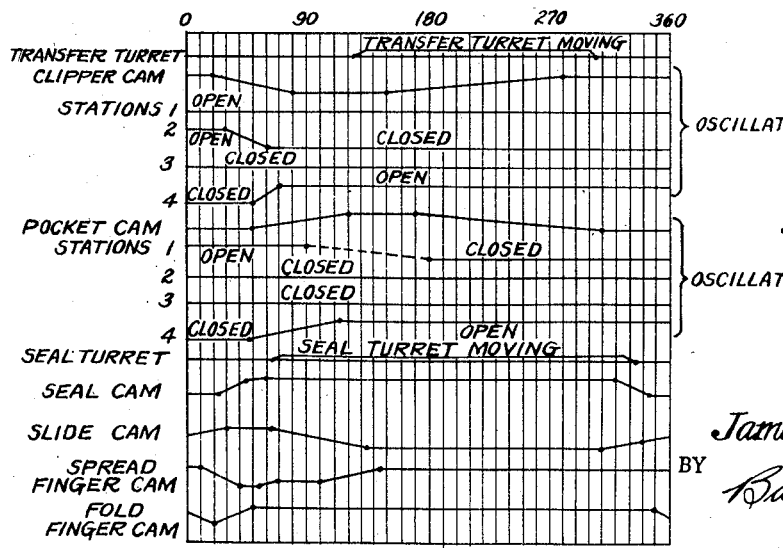
INVENTOR.
James C. Petrea
BY
Bacon & Thomas
ATTORNEYS

United States Patent Office 2,902,805
Patented Sept. 8, 1959

2,902,805
BAG CLOSER AND SEALER

James C. Petrea, Durham, N.C., assignor to Sperry Rand Corporation, New York, N.Y., a corporation of Delaware Application March 6, 1958, Serial No. 719,618

11 Claims. (Cl. 53—126)

This invention relates to bag closing and sealing devices, and particularly to an apparatus adapted to be positioned in a line of automatic machinery. The apparatus is adapted to receive bags already filled with the required quantity of a product and to close and seal the open ends of the bags.

The machine of the present invention is particularly well adapted to receive bags filled with the correct quantity of product from such a machine as shown and described in Patent No. 2,691,476, of James C. Petrea, and dated October 12, 1954. It is to be understood, however, that the machine of the present invention may receive its filled bags from any suitable mechanism or source.

The present invention comprises, in a preferred construction, a first turret having a plurality of bag-receiving pockets and means for indexing the turret to move those pockets through successive stations. The turret is indexed in response to a signal received from a bag-filling or delivering mechanism to operate through one cycle each time a filled bag is delivered thereto. The turret is provided with pockets to receive the filled bags and, at subsequent stations, the bag is flattened and closed at its upper end and held in closed condition by gripping means on the turret. At an intermediate station a rotary paddle-like structure beats against the end of the bag above the gripping means to dislodge and remove therefrom any of the product present above the grippers. At a final station the upper end of the flattened and closed bag is tucked between sealing and gripping jaws on an adjacent turret. The drive means then functions to close those jaws and open the pocket on the first turret and then index the second turret to remove the filled bag from its pocket while effecting heat sealing of the same and to carry the sealed bag to a delivery station where it is released for inspection or packing, etc.

It is therefore an object of this invention to provide an apparatus for receiving an open-ended filled bag and to flatten, close and seal the open end thereof and deliver the sealed bag to a delivery station.

Another object of the invention is to provide such an apparatus having bag-holding means comprising openable pockets whereby a bag may be placed in or removed from the pocket laterally thereof.

Still another object of the invention is to provide a machine of the type set forth wherein the bag-holding means are adjustable to predetermine the type of seal accomplished at the open end thereof.

A further object of the invention is to provide a cyclically operable bag-sealing machine wherein a cycle of operation is initiated by delivery of a filled bag thereto but wherein the heat-sealing cycle is of fixed and predetermined duration.

A still further object is to provide a bag closing and sealing apparatus with means for removing excess product therefrom.

An additional object is to provide, in a bag closing and sealing machine, novel drive means for turret-mounted sealing jaws.

Another object is to provide a machine of the type set forth that is rugged in construction and reliable in operation.

Further and additional objects and advantages will become apparent to those skilled in the art as the description proceeds with reference to the accompanying drawings, wherein:

Fig. 1 is a side elevational view of a preferred embodiment of the invention with certain parts broken away and other parts shown in section;

Fig. 2 is a top plan view of the mechanism of Fig. 1, shown on an enlarged scale, witth certain parts omitted to facilitate illustration and with the parts in different relative positions;

Fig. 3 is a fragmentary sectional view of the mechanism of Fig. 1 taken substantially along the line 3—3 of Fig. 1;

Fig. 4 is a fragmentary sectional view taken along the line 4—4 of Fig. 1;

Fig. 5 is a fragmentary sectional view taken along the line 5—5 of Fig. 1;

Fig. 6 is a fragmentary sectional view taken along the line 6—6 of Fig. 1 but showing the parts on an enlarged scale;

Fig. 7 is an enlarged fragmentary section taken along the line 7—7 of Fig. 1; and Fig. 8 is a timing chart showing the relative times of operation of the variation elements to be described, during a single cycle of operation.

Referring first to Figs. 1 and 2, the machine of the present invention comprises a first turret 2 and a second turret 4 mounted for rotary indexing about parallel vertical axes and arranged so that the path of movement of portions of the turret 4 overlap the path of movement of portions of the periphery of turret 2. Referring particularly to Fig. 2, turret 2 is provided with a plurality of bag-receiving pockets successively indexed through succeeding stations. Station I is the initial station wherein a filled bag is delivered into a pocket. The pocket is thereafter closed and indexed to station II wherein the upper end of the bag is flattened and closed, then gripped and held in closed condition by means to be described. At station III any of the product present in the flattened bag above the gripping means is removed from the bag. Station IV of turret 2 is a station common with one of the stations of turret 4 and wherein opposed sealing and gripping jaws on turret 4 are in position to receive the flattened upper end of a filled bag on turret 2. The jaws are automatically closed against the flattened bag, after the latter has been tucked therebetween, and the pocket on turret 2 is opened at this station. Subsequent indexing of the turrets results in turret 4 carrying the filled bag to a delivery station and simultaneously sealing the open end thereof. When the sealed bag reaches the delivery station, it is released from the jaws of the sealing turret 4 and delivered to an inspection table or the like (not shown).

Having described the general sequence of operations, the details of construction will now be shown.

Referring to Fig. 1, the machine comprises a suitable base housing 6 in which a drive motor 8 is mounted. The motor 8 is preferably a geared motor having an output sprocket 10 driving through a chain 12 to a driven sprocket 14 (see Fig. 5 also). The driven sprocket 14 is freely journalled on a main drive shaft 16 mounted in suitable brackets 18 in the machine base. One end of the main drive shaft 16 extends outwardly through the housing and is provided with a hand wheel 20 thereon whereby the drive shaft may be manually rotated for any desired purpose.

The driven sprocket 14 is secured to a driving member 22 of a 1-revolution clutch indicated generally at 24. Upon energization of the 1-revolution clutch the motor 8 is effective to rotate drive shaft 16 through a single revolution after which the clutch 24 automatically disengages itself and a brake is applied to hold the shaft 16 stationary. The clutch 24 and the brake referred to are conventional in the art and need not be described in further detail. It is contemplated that the clutch 24 be energized by a suitable electrical signal received from a bag-filling machine at the time a filled bag is deposited in the pocket at station I of turret 2, thereby initiating a cycle of operation.

A gear 26 is fixed to drive shaft 16 and meshes with gear 28 on auxiliary shaft 30. At one end, auxiliary shaft 30 carries the driving arm 32 of of spherical Geneva gear 34 mounted on a vertical shaft 36 suitably journalled in the machine frame 6. The auxiliary shaft 30 drives, through bevelled gears 38, to a gear 40 meshing with gear 42 fixed to sleeve 44. The sleeve 44 is journalled on the outside of and concentric to a vertical shaft 46 also suitably journalled in the machine base 6. The vertical shafts 36 and 46 constitute the main supporting and driving shafts for the turrets 2 and 4, respectively.

Turret 2 comprises a plate 48 fixed to vertical shaft 36. Support rods 50 are secured to plate 48 and extend downwardly therefrom. Brackets 52 are adjustably mounted on the support rods 50 for vertical adjustment thereon and each bracket 52 has fixed thereto a generally V-shaped bottom member 54. The members 54 constitute the bottoms of the bag-receiving pockets on turret 2. Each of the pockets on turret 2 also includes an outer pocket member 56 (Fig. 2) pivotally mounted at one edge of the pocket on suitable brackets on plate 48. The pocket members 56 are thus mounted for lateral swinging movement to open or close a side of each pocket. The members 56 are carried by arms 58 (see dotted line showing of Fig. 2) having extending lever portions 60. A tension spring 62 is connected to each lever 60 and to brackets 102 (Fig. 1) fixed on plate 48 whereby the springs 62 urge each of the pocket members 56 to closed position. Rotatably mounted on the exterior of vertical shaft 36 is a sleeve 64 (Fig. 1) on which a cam 66 is fixed. The cam 66 is provided with a cam track 68 (Fig. 2) in one face thereof. Levers 70 (only one of which is shown in Fig. 2) are pivoted to plate 48 on pivots 72 and are each provided with a cam follower 74 engageable with the cam track 68 of cam 66. The other end of each lever 70 bears against a face of a lever 60 carrying a pocket element 56. Thus the springs 62 hold the pocket members 56 in closed position and against an adjacent end of a lever 70. Preferably, the plate 48 is provided with suitable adjustable stop means (not shown) to limit the closing movement of pocket members 56 whereby the closed position thereof may be adjusted to accommodate for bags of different girth.

The sleeve 64 on which cam 66 is mounted, is provided with a lever 76 (Fig. 1) extending outwardly therefrom. The outer end of lever 66 is pivotally connected to a link (not shown in Fig. 1) extending generally perpendicular to the plane of the drawings, where it is pivoted at its other end to the upper end of a cam lever 78 journalled on a shaft 80 fixed on the machine base. An intermediate portion of the cam lever 78 is provided with a cam follower 82 engaging a cam track in a face of a cam 84 fixed on main drive shaft 16. Thus, rotation of shaft 16 and cam 84 results in rocking of cam lever 78 and oscillation of sleeve 64 and cam 66. The timing is such that the cam 66 is oscillated by cam 84 after the main drive shaft 16 starts a cycle of operation and before the Geneva gear 34 is actuated to index turret 2 through one station. Oscillation of cam 66 results in closing the pocket member 56 at station I, to thereby securely hold a filled bag therein, and opening the pocket at station IV.

The plate 48 of turret 2 is further provided with a plurality of brackets 86 (Fig. 1) adjacent an end of each of the pockets on that turret. Each of the brackets 86 rotatably supports a pair of gripper members 88 mounted thereon for rotary movement about parallel horizontal axes extending generally longitudinally of its adjacent pocket. Each of the gripper members 88 is carried by an arm 90 journalled in a bracket 86 on trunnions or shafts on which gears 92 and arms 90 are fixed. The gears 92 are spaced apart and in mesh with opposite sides of a double rack 94. The racks 94 are mounted on rods 96 slidably guided through brackets 86 and plate 48 to extend downwardly therebelow. Each rod 96 has a head 98 at its lower end. A compression spring 100 surrounds each rod 96 and reacts against the plate structure 48 to urge the racks 94 downwardly. As will be obvious from Fig. 1, downward movement of a rack 94 swings the gripper members 88 upwardly and inwardly to the position shown at the left of Fig. 1, whereas upward movement of the racks 94 causes the grippers 88 to move outwardly and downwardly to the position shown on the righthand side of Fig. 1.

Brackets 102, previously referred to, are fixed to the underside of plate 48 and rockably support levers 104. There is a lever 104 for each of the pockets on turret 2 and one end of each lever underlies the head 98 at the lower end of a rod 96. The inner end of each lever 104 is provided with a cam follower 106 (see also Fig. 2) engaging a face of a cam 108 fixed on a sleeve 110 which is, in turn, journalled on the outer surface of the sleeve 64 previously described. A lever 112 is fixed to the lower end of sleeve 110 and is connected to a link 114 extending generally perpendicular to the plane of Fig. 1. The link 114 is pivotally connected to the upper end of a cam lever 116 journalled on the shaft 80 previously described. The cam lever 116 is provided with a cam follower 118 intermediate its ends and which cam follower engages a cam track in one face of a cam 120 fixed to main drive shaft 16. Rotation of main drive shaft 16 and cam 120 thus results in rocking movement of lever 116 which, in turn, oscillates sleeve 110 and cam 108, for a purpose to be described.

Each of the grippers 88 comprises an elongated bar generally parallel to the direction of length of the pocket associated therewith and each gripper 88 is provided with a face insert 122 of neoprene or the like whereby the grippers may exert fairly high pressure on the sides of a flattened bag on the turret without cutting or mutilating the bag and even if some of the product happens to be in position to extend between the grippers 88.

The base frame 6 is provided, adjacent one end thereof, with an upstanding frame structure 124 on which a bridge plate 126 is mounted. The bridge plate 126 extends over the top of turret 2 and is provided with a suitable bearing 128 at its outer end and in which vertical shaft 46 of turret 4, previously described, is journalled. The upstanding frame structure 124 and plate 126 support a pair of guide rods 130 (see also Fig. 7) on which a block 132 is slidably guided. A lever 134 (Fig. 1) is pivotally mounted on a bracket 136 on the frame structure 124 and is connected, through a link 138, to the sliding block 132. A link 140 is pivoted to the lever 134 intermediate its ends and extends downwardly through the frame structure 124 into the base of the machine where it is connected to one end of a cam lever 142 pivoted on bracket 144 in the machine base (see Fig. 3 also). The cam lever 142 is provided with a cam follower 146 intermediate its ends and engageable with a cam track (not shown) in one face of a rotary cam 148 fixed on a shaft 150. By referring also to Fig. 3, it will be seen that shaft 150 is journalled in suitable brackets in the machine base and is driven, through bevelled gears 152, by the main drive shaft 16.

The slidable block 132 has a pair of spreader fingers 154 pivoted thereon. The fingers 154 are mounted on adjacent shafts 156 which are, in turn, interconnected by meshing pinions 158. Thus, fingers 154 are constrained to simultaneous and equal and opposite pivotal movements on the block 132. One of the shafts 156 is provided with a depending finger 157, at the rear of block 132, having a roller 158 thereon bearing against the adjacent side of an arm 160 of a bell crank. A tension spring 159 urges the fingers 154 together. The bell crank is journalled at 162 on a suitable bracket in frame structure 124. The other arm 164 of the bell crank is pivotally connected to a link 166 which extends downwardly through the frame structure 124 and is connected to a cam lever 168 (Fig. 3) also pivotally mounted on bracket 144 and having a cam follower engageable with a cam track in cam 170 mounted on shaft 150, previously described.

The cams 148 and 170 are rotated in unison with main drive shaft 16 and the cam tracks thereon are so configured that the link 140 is first pulled downwardly to lower block 132 and fingers 154 into the open end of a bag at station II of turret 2. (During this movement the roller 158 rolls along the arm 160.) Thereafter, cam 170 functions to lift link 166 and thereby spread the fingers 154 apart (by moving roller 158 outwardly) to spread and flatten the open end of a filled bag on turret 2. The cam 120, previously described, acts to oscillate cam 108 and swing grippers 88 up into gripping engagement with the flattened upper end of the bag by about the time fingers 154 get the bag flattened.

A shaft 172 (Fig. 1) is journalled in suitable brackets 174 on the bridge plate 126 and on frame structure 124 and extends generally horizontally in the direction of length of a pocket on turret 2 and over station III. The shaft is provided with a plurality of radial paddles 176 thereon. The shaft 172 is provided with a pulley 178 and is rotated by a belt 180 driven by small motor 182 mounted on the frame structure 124. The shaft 172 preferably rotates continuously. When a filled bag is delivered to the turret 2 at station I and contains such products as potato chips or the like, often one or more of the chips extend upwardly to a position close to the upper end of the bag. When the grippers 88 close on the bag, below the upper edge thereof, such upwardly extending chips or other product are squeezed between the edges of the grippers and severed from the remainder of the product therebelow. It is necessary that such fragments be removed from between the sides of the closed bag before those sides can be effectively heat sealed. When the turret 2 is indexed to position a bag at station III any such fragments within the open end of the bag and above grippers 88 is removed by the action of the paddles 176 on shaft 172. The shaft 172 and paddles 176 rotate in a counterclockwise direction, as seen from the left of Fig. 1, so that the paddles "slap" and agitate the upper edges of the closed bag and this action has been found to be very effective to remove fragments of the product therefrom.

Referring now to Figs. 1, 3 and 4, the vertical shaft 46 defining the axis of turret 4, extends downwardly into the frame base 6 to the rear of the main drive shaft 16 and clutch 24. The shaft 46 has a bevelled gear 184 fixed thereon and in mesh with a bevelled gear 186 on a secondary shaft 188 journalled in the bracket 18 previously described, and a suitable bearing 190 (Fig. 1) mounted on an end wall of the frame base 6. A gear 192 is fixed on the shaft 188 to the left of the bracket 18.

The main drive shaft 16 extends to the left of bracket 18 and has a crank arm 194 fixed on its end. A small gear 196 is fixed on the end of the crank arm 194 eccentrically of the shaft 16. The gear 196 (Fig. 5) meshes with an idler gear 198 and the two are held in mesh by a link 200 pivotally joining their axes. The idler gear 198 is in turn meshed with the gear 192 on shaft 188 and is held in mesh therewith by a second link 202 pivotally joining the axes of gears 192 and 198. By this structure rotation of the shaft 16 causes eccentric gear 196 to rotate bodily around the axis of shaft 16 while being rigid with said shaft. Thus the gear 196 not only goes through one complete revolution at each cycle, but also acts as a crank to oscillate gear 198 about the axis of gear 192. That oscillation is simultaneous with rotation of gear 196, which is likewise imparted to gear 198. Thus, during oscillatory movements of gear 198 in one direction, its rotation about its own axis is added to that oscillatory movement and rotation is imparted to gear 192. During oscillation in the other direction, oscillatory movement of gear 198 is subtracted from its rotary movement and during at least a portion of that stroke of oscillation the gear 192 remains stationary. Since gear 192 effects rotary drive of the turret 4, it will be obvious that the turret 4 is intermittently rotated and the parts are so proportioned and timed that rotary indexing of turret 4, through 180°, is accomplished only during the intermediate portion of a cycle of operation of the shaft 16. During the initial and final intervals of a cycle of rotation of shaft 16 the turret 4 is stationary, as will be further described, and as evident from the timing chart of Fig. 8.

The oscillatory gear drive just described in connection with Figs. 1, 3 and 4 is a known mechanism.

Immediately below bevelled gear 184 on shaft 46, a latch disc 204 is provided and which is also fixed on the shaft 46. The disc 204 is provided with a pair of notches 206 in its periphery. A latch arm 208 is pivotally mounted on the frame base 6 and is provided with a roller 210 intermediate its ends. A spring 212 normally urges the latch arm 208 inwardly to hold roller 210 against the periphery of disc 204. The notches 206 are so positioned that the roller 210 enters one of those notches at about the end of the indexing movement of turret 4 and the mechanism functions as a latch to hold the turret in indexed position against inadvertent displacement.

The turret 4 is provided with a support 214 (see Figs. 1 and 6) fixed to the shaft 46. The support 214 extends generally diametrically of the turret and is provided at opposed ends with fixed sealing jaws 216. Movable sealing jaws 218 are carried by levers 220 pivotally supported on the support 214 by suitable pivot means 222. The arms 220 extend downwardly below the support 214 and inwardly past opposite sides of the shaft 46. At its lower end, each arm 220 is provided with a cam follower roller 224.

By reference to Fig. 6 it will be seen that the gear 42 and sleeve 44, previously described as being rotatable about the shaft 46, are supported in axial position on shaft 46 by a collar 226 affixed to the shaft 46. A bevelled gear 228 is fixedly secured to the sleeve 44 at its upper end and meshes with a pair of bevelled gears 230. The gears 230 are journalled on opposed trunnions 232 extending laterally from a block 234 fixed on shaft 46 above the bevelled gear 228. A cam 236 is fixed to each of the gears 230 in position to engage and actuate a corresponding roller 224 on the adjacent movable jaw supporting arm 220. Each of the cams 236 is preferably angularly adjustable with respect to its associated gear 230 by means of screw and slot securing means 238 (Fig. 1). Gears 230 and cams 236 are held on trunnions 232 by collars 239. Tension springs 240 (Fig. 1) are attached to opposite sides of the two arms 220 to hold their cam followers in firm engagement with the peripheries of the cams 236 and to normally swing the arms 220 in a direction to move their respective jaws 218 away from the opposed fixed jaw 216 (only one spring 240 is shown in Fig. 1).

It will be evident from the structure thus far described that the sleeve 44, which rotates the cams 236, rotates continuously and uniformly during an entire cycle of operation of the main drive shaft 16. The mechanism described in connection with Figs. 1, 4 and 5, operates to rotate the turret 4 during only a portion of the cycle of operation of shaft 16. The parts are so proportioned and arranged that rotation of sleeve 44 and rotary movements of shaft 46 take place in the same direction. Thus, while the shaft 46 and sleeve 44 are both rotating, substantially no rotary movement is imparted to the cams 236. However, during those intervals when sleeve 44 is rotating and shaft 46 is stationary, the cams 236 are caused to rotate to operate the sealing jaws 218. As previously described the shaft 46 is stationary during the initial and final portions of each cycle of operation. During said initial portion of a cycle the jaws shown at the righthand side of turret 4 in Fig. 1 are moved to closed position and are caused to open, when moved to the position at the left side of the turret 4 in Fig. 1 during the final portion of a cycle, as will be further described.

The bridge plate 126 (Fig. 1) is provided with brackets having a transverse shaft 242 journalled therein. The shaft 242 is provided with a depending arm 244 and a pair of depending arms 248 extending downwardly past the opposite edges of the bridge plate 126 (see Fig. 2 also) and having a transverse blade 250 fixed to its lower end. The blade 250 extends the length of the jaws 216 and 218 and the parts are so proportioned and dimensioned that clockwise rocking of arm 248 projects the blade 250 into the space between the opened jaws 216 and 218. A suitable tension spring 252 is provided to normally effect retraction of the blade 250 from between the sealing jaws. The shaft 242 is forcibly oscillated in a clockwise direction by means of a horizontal link 254 pivoted to the depending arm 244. The other end of link 254 is pivoted to a bell crank 256 which, in turn, is pivotally mounted, at 258, on the upstanding frame structure 124. The other arm of the bell crank 256 is pivotally attached to a vertical link 260 extending downwardly through the frame structure 124 and into the base frame 6. The lower end of link 260 is pivoted to a cam lever 262 (Fig. 3) which is also pivotally mounted on bracket 144 and provided with a cam follower 264 engageable in a cam track in one face of a cam 268 fixed to shaft 150, previously described. As the cam 268 rotates and follower 264 follows the cam track, motion is imparted to the blade 250 to cause the latter to swing inwardly between the jaws on turret 4 then out again. As will be obvious, that portion of a filled bag on turret 2 which is held in closed and flattened condition at station IV and which extends upwardly above the grippers 88 is engaged by the blade 250 and folded inwardly between the adjacent sealing jaws on turret 4. The previously described adjustable bottom elements 54 for the bag-receiving pockets on turret 2 may be vertically adjusted so that any desired amount of the bag end projects above the grippers 88 at station IV. If a substantial length of bag projects above those grippers, the blade 250 will form a fold in the end of the bag and will tuck that fold between the sealing jaws. Subsequent closing of the jaws will result in a folded transverse seal. On the other hand, if the members 54 are adjusted so that a lesser portion of the bag extends above the grippers 88, the entire end portion of the flattened bag will be tucked between the sealing jaws and a flat seal (without folds) will be formed.

The sealing jaws 216 and 218 are provided with suitable heating and heat control elements therein (not shown) to maintain those jaws at a suitable temperature for heat sealing the material of the particular bags. Electrical current is conducted to the heating elements in the sealing jaws through slip rings 270 (Fig. 1) carried by the upper end of shaft 46. Suitable brushes 272 mounted on the bridge plate 126 serve to conduct current to the slip rings 270 and thence to the jaws 216 and 218 through suitable wiring (not shown).

In the following description of the sequence of operations, let it first be assumed that the machine disclosed has proceeded through a series of previous cycles of operation and has completed the last cycle thereof, after which the 1-revolution clutch 24 disengaged and wherein main drive shaft 16 is stationary. At the completion of the previous cycle, turrets 2 and 4 stopped in the positions shown in Figs. 1 and 2. The pocket of turret 2 which is at station I is empty and awaiting receipt of a filled bag. The side 56 thereof is held in the open position shown in Fig. 2. A filled bag is present in the pocket at station II but the grippers 88 are in the retracted position shown in Fig. 1 and the spreader fingers 154 are substantially in the upper position also shown in Fig. 1. A filled bag is in the pocket at station III but it has been flattened and is being held by grippers 88 in position below the rotating shaft 172. Paddles 176 are "beating" the upper edge of the bag at station III to discharge any of the product therein above the grippers. A filled bag is at station IV with the grippers 88 in closed position shown in Fig. 1 but with the blade 250 on arm 248 in a retracted position. The sides 56 of the pockets at stations II, III and IV are closed and both pairs of jaws on the turret 4 are open. Further, at the end of the previous cycle, the parts were brought to a standstill with the driving arm 32 of Geneva gear 34 in the upper position shown in Fig. 1.

Now assume that a filled bag is moved laterally into the open pocket on turret 2 at station I. The instrumentality delivering that bag simultaneously transmits an electrical pulse to the 1-revolution clutch 24 to disengage the brake, previously referred to, and to engage clutch 24 to drive shaft 16 through a single revolution. When clutch 24 is first engaged it starts to rotate the shaft 16 and auxiliary shaft 30. However, since the operating arm 32 for the Geneva gear is in its upper position, initial rotation of auxiliary shaft 30 does not start indexing movement of turret 2 because the driving arm 32 of the Geneva gear must first advance through a substantial angle. That indexing movement takes place during an intermediate portion of a cycle of operation. Likewise, the gear mechanism of Fig. 5, during the initial portion of a cycle does not rotate the shaft 46. Reference to the timing chart of Fig. 8 shows that the gear mechanism of Fig. 5 starts indexing movement of turret 4 after about 65° of rotation of shaft 16 whereas indexing movement of turret 2 does not start until the shaft 16 has rotated through about 125°. During the initial rotation of shaft 16, at the commencement of a cycle, cams 84 and 120 carried thereby and cams 148, 170 and 268, on shaft 150, are being rotated. By reference to the timing chart of Fig. 8 it will be seen that rotation of the cams before commencement of turret movement, results in starting to close the open side 56 of a pocket at station I and at the same time opens the side 56 of the pocket at station IV. It will be seen from the chart that the pocket being closed at station I is not fully closed until after turret 2 starts to index. However, the pocket at station IV is moved to completely open position before turret 2 starts to move. Opening of the pocket at station IV and closing of the pocket at station I is accomplished through cam 84 on shaft 16 acting to oscillate cam 66 in the manner previously described. While the pockets at stations I and IV are being respectively opened and closed, as described above, cam 148 operates to lower the block 132 on guide rods 130 and to project the ends of spreader fingers 154 into the upper end of the bag at station II. As soon as the fingers are within the end of the bag, cam 170 causes the fingers to spread to open and flatten that bag as cam 120 begins to oscillate cam 108 to close grippers 88 on the flattened bag. The cams 148 and 170 are so configured that the spreader fingers 154 move downwardly, spread the bag, and start again to move upwardly as the grippers 88 engage the flattened bag at station II. During this same interval the paddles 176 have been operating on a flattened and gripped bag at station III for the purpose previously described. During this same initial interval, before the turrets 2 or 4 start to move, the shaft 16 drives through gears 26, 28, 38, 40 and 42 to rotate the cams 236 on turret 4. It is to be remembered that shaft 46 is stationary at this time. This initial rotation of cams 236 results in closing the jaws adjacent station IV of turret 2, the jaws on the opposite side of turret 4 remaining open. As cams 236 start to close the righthand jaws 216 and 218, the cam 268 operates to swing blade 250 to the left as seen in Fig. 1 to tuck the upper end of the flattened bag between jaws 216 and 218 and to retract that blade by the time the jaws have substantially closed. This positions the upper edge of the bag at station IV between the jaws and clamps the jaws thereon to commence heat sealing the open end of the bag. At about that same time cam 120 (while oscillating cam 108 to close the grippers 88 at station II) also actuates the grippers 88 at station IV to open position to release the bag thereat which has now been gripped by the jaws 216 and 218.

After the above functions are completed, and all of which take place before the turrets start to index, the gear mechanism of Fig. 5 has reached a point in its cycle where it starts rotation of turret 4. Rotation of turret 4, with a bag gripped between jaws 216 and 218, results in removal of the bag being sealed from the now open pocket on turret 2 and transfer of that bag to the delivery station at the left of turret 4 (Fig. 1). Such indexing movement of turret 4 is accomplished by the time the main drive shaft is moved through about 335° of a cycle, at which time the turret 4 is stopped. After turret 4 stops the cams 236 resume rotation about their horizontal axes to open the jaws at the delivery station and release a filled, sealed bag. It is to be noted that the time interval during which the heat-sealing jaws operate on a bag being sealed is a fixed and predetermined time interval, depending only on the length of one cycle of operation of shaft 16 and independent of the time interval between delivery of filled bags to station I of turret 2. Thus the bags are uniformly heat sealed, irrespective of any waiting intervals between cycles.

As is also apparent from the timing chart of Fig. 8, after turret 4 has started to rotate and has removed a bag from the pocket of turret 2 at station IV, turret 2 is driven by Geneva gear 34 through a 90° indexing movement, which commences at about 125° of rotation of shaft 16. Indexing of turret 2 is completed by the time shaft 16 has turned through 305°, after which turret 2 stops and remains stationary. During the final interval of a cycle of rotation of shaft 16, after turret 2 has been stopped, the sealing cams 236 complete their function to release a bag at the delivery station, the slide block 32 is returned to its upper position and inward movement of blade 250 is commenced. The cams operate during this final operation of a cycle to bring the parts to the positions that were described heretofore as being at the beginning of a cycle and the mechanism is conditioned for a subsequent cycle of operation whenever a filled bag is delivered to the then empty pocket of station I of turret 2.

While a single specific embodiment of the invention has been shown and described herein, it is to be understood that this embodiment is merely to illustrate the principles of the invention and that other embodiments are contemplated within the scope of the appended claims.

I claim:

1. A bag closer and sealer comprising; first and second adjacent turrets, said first turret having holding means thereon for receiving filled open-ended bags and means for flattening and closing the open ends thereof, said second turret having a plurality of pairs of relatively movable sealing and gripping jaws thereon, cyclically operable drive means for intermittently indexing said turrets to successively position a closed bag and a pair of said jaws at a common station with said jaws separated, said turrets being arranged so that the flattened closed end of a bag is receivable between said separated jaws at said common station, said cyclically operable drive means including means for moving said jaws together at said common station to seal and grip said bag end whereby indexing movement of said second turret causes said jaws to remove said bag from said first turret and carry the same to a delivery position remote therefrom.

2. A bag closer and sealer as defined in claim 1 wherein said holding means comprise elements defining bag-receiving pockets, a side element of each pocket being movable outwardly whereby a filled bag may be moved laterally into or out of said pocket in a direction generally tangential to said first turret, said drive means being arranged to hold said elements outwardly at a bag-receiving station, to then move said elements inwardly to close said pockets, and to thereafter move said elements outwardly at said common station.

3. A bag closer and sealer as defined in claim 1 including means at said common station for pushing the flattened open end of a filled bag between said jaws.

4. A bag closer and sealer as defined in claim 3 wherein said holding means are defined in part by a vertically adjustable bottom element whereby to adjust the vertical position of a filled bag therein to predetermine the amount of the upper end thereof to be pushed between said jaws.

5. A bag closer and sealer as defined in claim 1 wherein said first turret includes opposed movable gripping means for gripping the flattened end of a filled bag thereon below the open upper end thereof, and means at an intermediate station of said first turret for removing from the bag any of its contents above said gripping means.

6. A bag closer and sealer comprising; a rotary turret mounted for rotation about a fixed axis, a plurality of pairs of bag gripping jaws mounted thereon for relative movement, cam means on said turret for opening and closing said jaws and including a cam operating member mounted for independent rotation about said fixed axis, cyclically operable drive means including means for continuously rotating said cam operating member about said axis in one direction during the entire duration of each cycle of operation and means rotating said turret about said axis in said direction during only an intermediate portion of each cycle.

7. A bag closer and sealer as defined in claim 6 including heating means for said jaws whereby to heat-seal a bag gripped thereby, said drive means being arranged to close a pair of said jaws at a first station at the beginning of each cycle and while said turret is stationary, to then index said turret, while said jaws are held closed, to position said closed jaws at a second station, and to then open said jaws to release a bag therefrom.

8. A bag closer and sealer comprising; a turret having holding means thereon for receiving filled open-ended bags and means for flattening and closing the open ends thereof including opposed movable gripping means for gripping the flattened end of a filled bag thereon below the open upper end thereof, cyclically operable drive means for intermittently indexing said turret to position the bags thereon at successive stations, a rotary shaft at an intermediate station of said turret and paddles on said shaft arranged to engage and agitate the upper end of a bag at said station for removing from the bag any of its contents above said gripping means.

9. A bag closer and sealer comprising; a rotary turret mounted for rotation about a fixed axis, a plurality of pairs of bag gripping jaws mounted thereon for relative movement, operating means on said turret for opening and closing said jaws and including a rotary control member mounted for independent rotation about said fixed axis for actuating said operating means, cyclically operable drive means including means for continuously rotating said rotary control member about said axis in one direction during the entire duration of each cycle of operation and means rotating said turret about said axis in said direction during only an intermediate portion of each cycle.

10. A bag closer and sealer as defined in claim 9 including heating means for said jaws whereby to heat-seal a bag gripped thereby, said drive means being arranged to actuate said operating means to close a pair of said jaws at a first station at the beginning of each cycle and while said turret is stationary, to then index said turret, while said jaws are held closed, to position said closed jaws at a second station, and to then open said jaws to release a bag therefrom.

11. A bag closer and sealer comprising; first means for carrying a closed filled bag along a first predetermined path to a final station, a pair of opposed bag gripping and sealing jaws mounted for movement in unison along a second predetermined path substantially tangent to said first path at said final station but diverging therefrom toward a delivery position, means for moving said jaws along said second path and for closing said jaws on the top of a closed filled bag at said final station and for holding said jaws clamped onto said bag during movement to said delivery position whereby said jaws remove said bag from said first means and carry the same, suspended from said jaws, to said delivery position while sealing the top of said bag.

References Cited in the file of this patent

UNITED STATES PATENTS

| | | |
|---|---|---|
| 2,114,622 | Bergstein | Apr. 19, 1938 |
| 2,218,585 | Merkle | Oct. 22, 1940 |
| 2,257,777 | Anderson | Oct. 7, 1941 |
| 2,267,880 | Vogt | Dec. 30, 1941 |
| 2,321,729 | Beasley | June 15, 1943 |
| 2,514,867 | Howard et al. | July 11, 1950 |